United States Patent [19]
O'Dea

[11] Patent Number: 6,062,699
[45] Date of Patent: May 16, 2000

[54] TWO-PLANE REAR VIEW SAFETY MIRROR

[76] Inventor: Joseph C. O'Dea, 3959 Avon Rd., Geneseo, N.Y. 14454

[21] Appl. No.: 09/173,971

[22] Filed: Oct. 16, 1998

[51] Int. Cl.⁷ ...................................................... G02B 5/08
[52] U.S. Cl. .......................... 359/850; 359/851; 359/854; 359/855; 248/476; 248/479
[58] Field of Search ..................................... 359/850, 851, 359/854, 855, 862, 866, 856, 857, 865, 861, 864; 248/476, 474, 479, 477

[56] References Cited

U.S. PATENT DOCUMENTS

| | | | |
|---|---|---|---|
| 3,797,920 | 3/1974 | Beach, Jr. ................................ | 359/866 |
| 3,826,563 | 7/1974 | Davis ....................................... | 359/865 |
| 5,805,366 | 9/1998 | McFarland .............................. | 359/872 |

OTHER PUBLICATIONS

Don Watts, "Survival Tip", Motor Cyclist, p. 85, Sep. 1998.
"Blind Spot Mirrors Let You Change Lanes With Confidence!", AAA Members' Marketplace Catalog, Oct. 1, 1998.

*Primary Examiner*—Cassandra Spyrou
*Assistant Examiner*—Mohammad Y. Sikder
*Attorney, Agent, or Firm*—Crowell & Moring LLP

[57] ABSTRACT

A rear view safety mirror includes two single-planed mirrors mounted at an angle to one another. In the preferred embodiment, the inside mirror is mounted at a steeper pitch than the outside mirror. Preferably, the mirrors are mounted in pockets or slots in a one piece molded plastic housing, wherein the pockets or slots are configured to have the angle. The plastic housing is mounted to the vehicle in a conventional manner, thereby providing the vehicle's operator with familiar adjustment control.

14 Claims, 7 Drawing Sheets

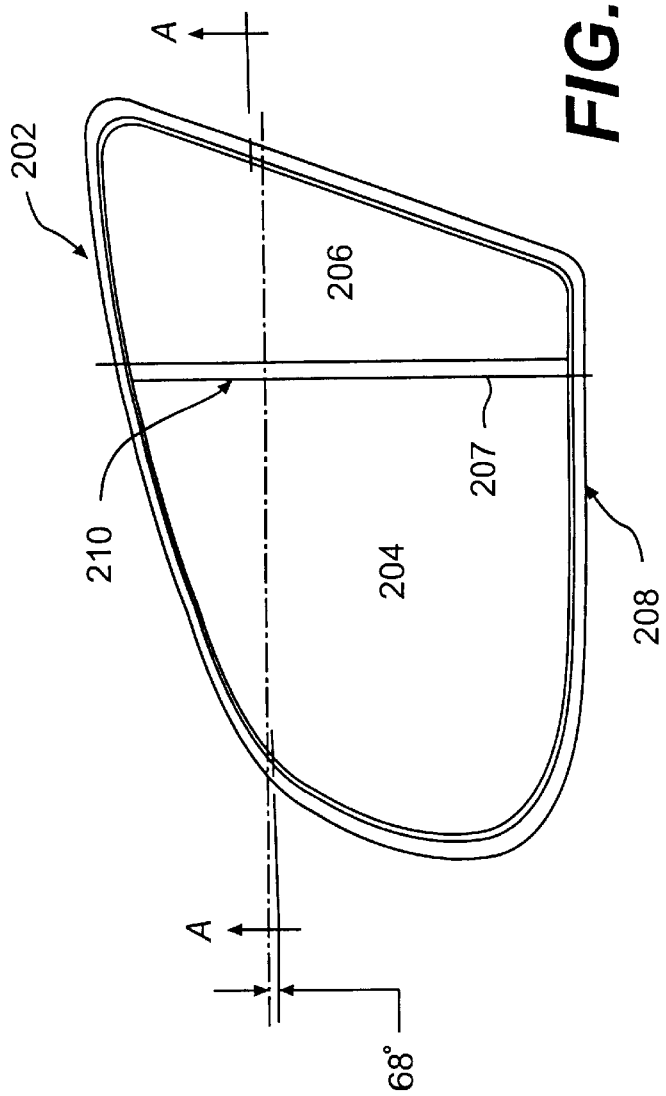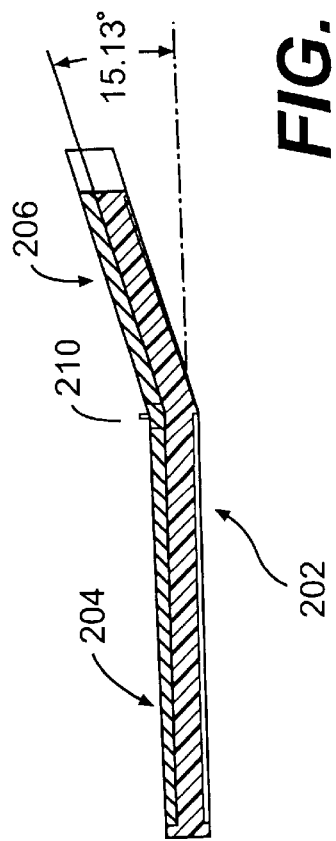

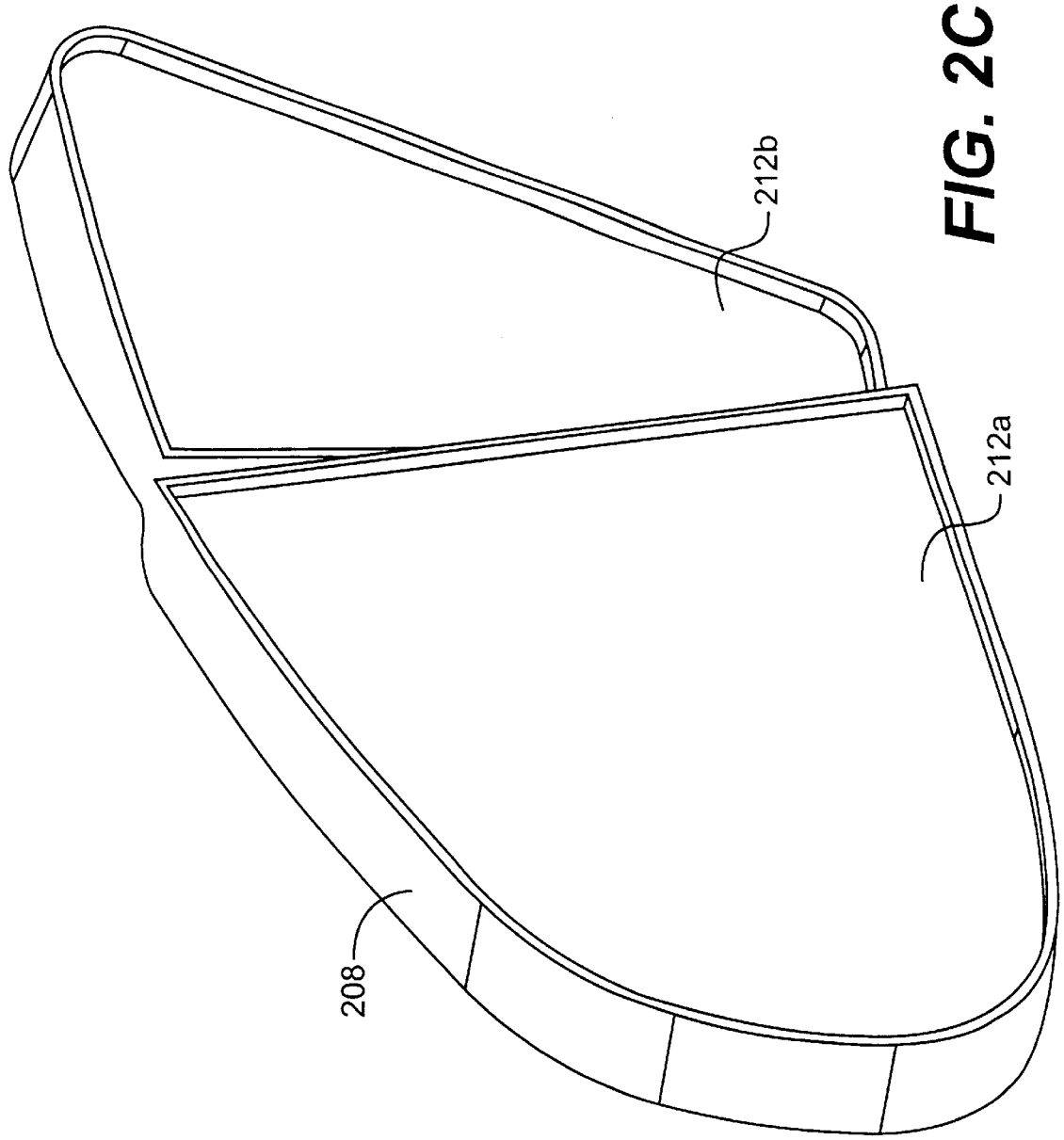

TWO-PLANE REAR VIEW SAFETY MIRROR

FIELD OF INVENTION

The present invention relates generally to vehicle safety devices and methods. More specifically, the present invention relates to an apparatus and method for improving the field of view of rear view mirrors to operators of motor vehicles.

BACKGROUND OF THE INVENTION

Conventional rear view mirrors are single-planar mirrors. Such rear view mirrors are deficient in revealing the well-known and serious problem generally termed the "blind spot." Referring to FIG. 1, a motor vehicle 102 is illustrated travelling in a highway lane 103. Motor vehicle 102 has a conventional externally-mounted left rear view mirror 104, a conventional internally mounted center rear view mirror 106 and a conventional externally-mounted right rear view mirror 108. Using rear view mirrors 104, 106 and 108, the operator of motor vehicle 102 has a field of view indicated by field of view 110. However, this field of view does not include what is known as the "blind spot" 112.

As illustrated in FIG. 1, the blind spot can cover a significant area, and often includes other motor vehicles traveling in adjacent highway lanes, for example motor vehicle 114 traveling in lane 115. Consequently, if the operator of motor vehicle 102 change lanes from lane 103 to lane 115 after checking only left rear view mirror 104, he may not see motor vehicle 114. Consequently, the lane change could result in an accident, sometimes referred to as "blind siding."

The risk of this type of accident could be reduced significantly by substantially eliminating the blind spot. Several prior apparatus attempted to solve the problem. Racecar drivers, for example, have attempted to increase their competitive efficiency on a racetrack by adding lateral extensions to their internally mounted center rear view mirror and angling those extensions so that the left side extension gives a view to the right side and the right side extension gives a view to the left side. For several reasons, this solution has not met with general acceptance by the non-racing public. First, there is significant occlusion of the required view by the structure of the automobile, passengers, cargo and/or frosting or steaming up. Second, there is often confusion because the added right side extension views the left side of the vehicle and the added left extension views the right side of the vehicle.

Another attempt to solve the problem has been employed by some truckers. A small convex mirror is mounted on the conventional external flat plane mirrors in an effort to somewhat enhance the rear view when backing up, for example, backing up to loading docks. However, the small convex mirror does not adequately cover the blind spot and significantly distorts the reflected image and is therefore of no practical value in the normal driving environment.

The need of an operator to be able to view any vehicles approaching on the left and/or right sides of the vehicles is being exacerbated daily by the development more and more high-speed multi-laned highways because passing on both the left and right sides of a vehicle is generally practiced. The sound level of car radios and tapes often muffles the sound of overtaking vehicles. Other distractions, including cellular telephones and other hi-tech devices, further increase the risk of blind siding accidents caused by the operator's inability to see or hear vehicles in the blind spot caused by conventional rear view mirrors.

Thus, what is required is a rear view mirror configuration that substantially reduces, or eliminates completely the blind spot associated with conventional single-planed rear view mirrors. In addition, the rear view mirror should be able to be easily mounted on a wide variety of motor vehicles including, but not limited to: passenger vehicles, recreational vehicles, vans, pick up trucks, panel trucks and motorcycles.

SUMMARY OF THE INVENTION

The two-plane rear view safety mirror of the present invention comprises two single-planed mirrors mounted at an angle to one another in a single frame. This configuration substantially reduces or eliminates the blind spot associated with conventional single-planed rear view mirrors. Using the rear view safety mirror of the present invention therefore, allows the operator of a motor vehicle to see vehicles that may be overtaking his on either side.

The preferred embodiment comprises two single-planed mirrors, an outside mirror (furthest from the operator) and an inside mirror (closest to the operator). The outside and inside mirrors are mounted at an angle to one another. In addition, the inside mirror is mounted at a steeper pitch (i.e., the top of the inside mirror is more toward the rear of the vehicle than its bottom) than the outside mirror. The single-planed mirrors are preferably placed in a one piece molded plastic housing having pockets or slots into which the single planes mirrors are placed. The pockets or slots are at an angle to one another. In the preferred embodiment, the angle is fixed. As with conventional rear view mirrors, the entire assembly (housing including single-planed mirrors mounted at an angle to each other) can be adjusted to suit a particular operator. In an alternate embodiment, one or both of the pockets (or slots) are independently adjustable so that the angle between the single-planed mirrors can be varied, in addition to adjustment of the entire assembly.

In the preferred embodiment, the relative size of the outside single-planed mirror is of sufficient size so that the operator has substantially the same field of view as that given by conventional rear view mirrors. However, unlike conventional rear view mirrors, the rear view safety mirror of the present invention substantially eliminates the view of the structure of the side and rear of the vehicle on which it is mounted, because that portion of the image has little or no value to the operator of the vehicle. This portion is used by the present invention for the inside mirror, which reflects the blind spot image that is hidden from the operator's view in conventional rear view mirrors. Thus, the inside mirror preferably has a size corresponding to the portion of a conventional rear view mirror that reflects the vehicular structure. Preferably, this size is about 30% of the viewing area of a conventional rear view mirror. This can be changed by the manufacturer within the scope and spirit of the present invention.

Although the single-planed mirrors of both the left and the right rear view safety mirrors of the present invention can have substantially the same dimensions, in the preferred embodiment they do not. The sizes of the single-planed mirrors in of the right rear view safety mirror are adjusted to account for the fact that the operator of the vehicle is further from the right rear view safety mirror than the left rear view safety mirror.

As described above, the two-plane rear view safety mirror of the present invention affords the operator of a motor vehicle substantially the optimum conventional view to the rear of the single plane mirror and in addition a simultaneous second view which covers the blind spot between the reflected image of the single plane mirror and the operator's lateral vision. The right two-plane rear view safety mirror affords a comparable range of vision on the right side of the vehicle.

These and other objects of the present invention are described in greater detail in the detailed description of the invention, the appended drawings and the attached claims.

BRIEF DESCRIPTION OF THE DRAWINGS

FIG. 2A is a schematic illustration of a front view of the left side rear view safety mirror according to a preferred embodiment of the present invention.

FIG. 2B is a cross-section of the rear view safety mirror illustrated in FIG. 1 taken along line A—A in FIG. 2A FIG. 2C illustrates a housing with pockets for the planar mirrors according to a preferred embodiment of the present invention.

DETAILED DESCRIPTION OF THE PREFERRED EMBODIMENTS

The two-plane mirror of the present invention provides a simple, safe readily usable system to substantially preserve the optimum view to the rear, and in addition, a ready view of the blind spot area not reflected in conventional single-planar rear view mirrors. In this way the operator of a motor vehicle equipped with a rear view safety mirror of the present invention has a view of an overtaking vehicle at all times until the overtaking vehicles is abreast of and in the direct sight of the operator's lateral vision.

The present invention is described in terms of a "left-hand drive" vehicle. A left-hand drive vehicle is one in which the driving controls are located on the left hand side of the vehicle. The present invention is applicable to "right hand drive" vehicles (i.e., those having driving controls on the right side of the vehicle). For right hand drive vehicles, the ensuing description of the left and right rear view safety mirrors should be reversed. That is, the ensuing description of the left rear view safety mirror describes the right rear view safety mirror in a right hand drive vehicle, and similarly, the description of the right rear view safety mirror describes the left rear view safety mirror of a right hand drive vehicle.

Further, the present invention is applicable to vehicles having centrally located operators, e.g., motorcycles and bicycles. In this case, both mirrors are substantially the same. In a preferred embodiment, either the left or right rear view safety mirror as described below can be used on both sides of the vehicle.

Figure 1:
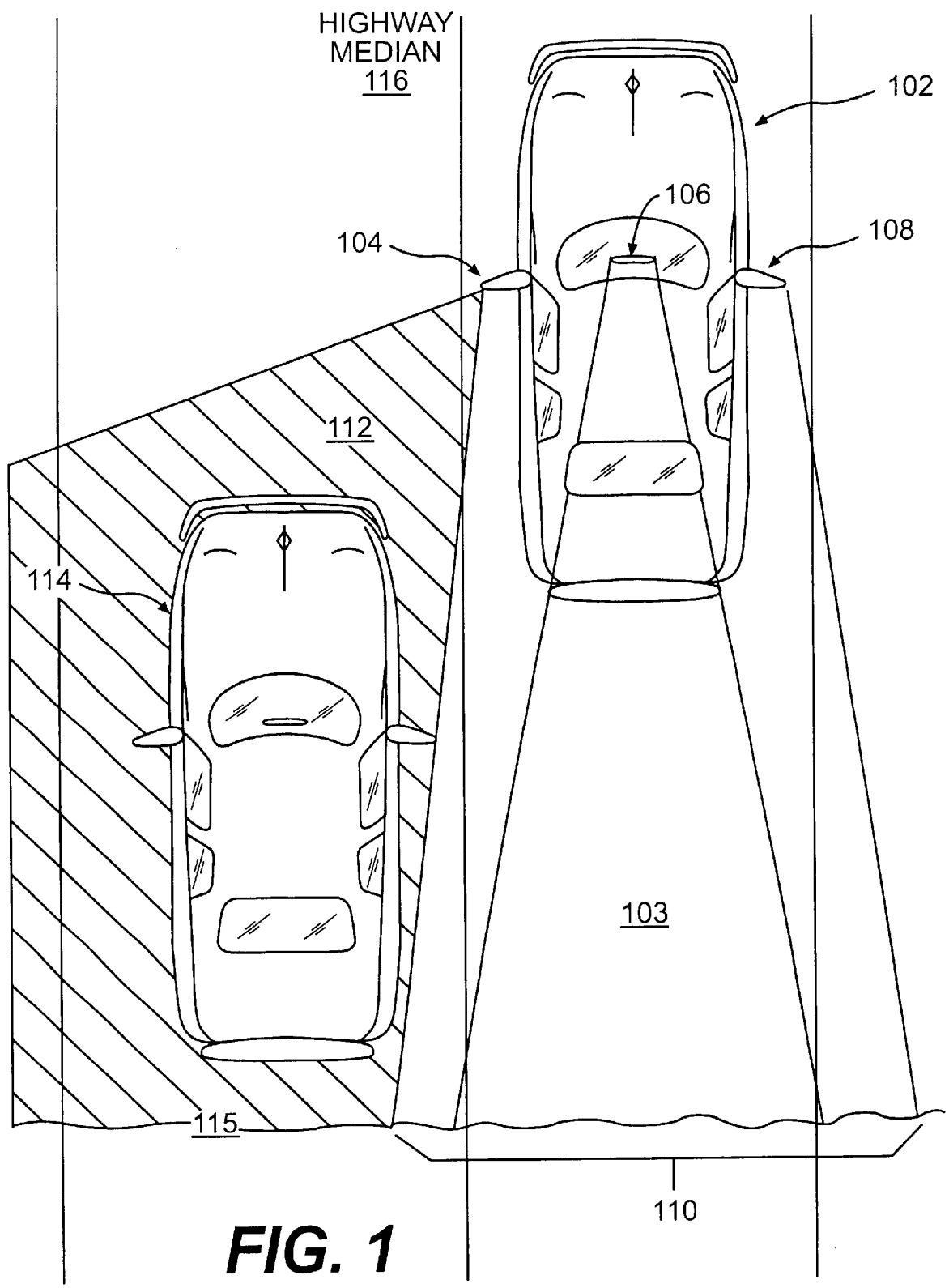
FIG. 1 is a schematic illustration of the field of view of a conventional rear view mirror, and its associated blind spot.
Figure 2D:
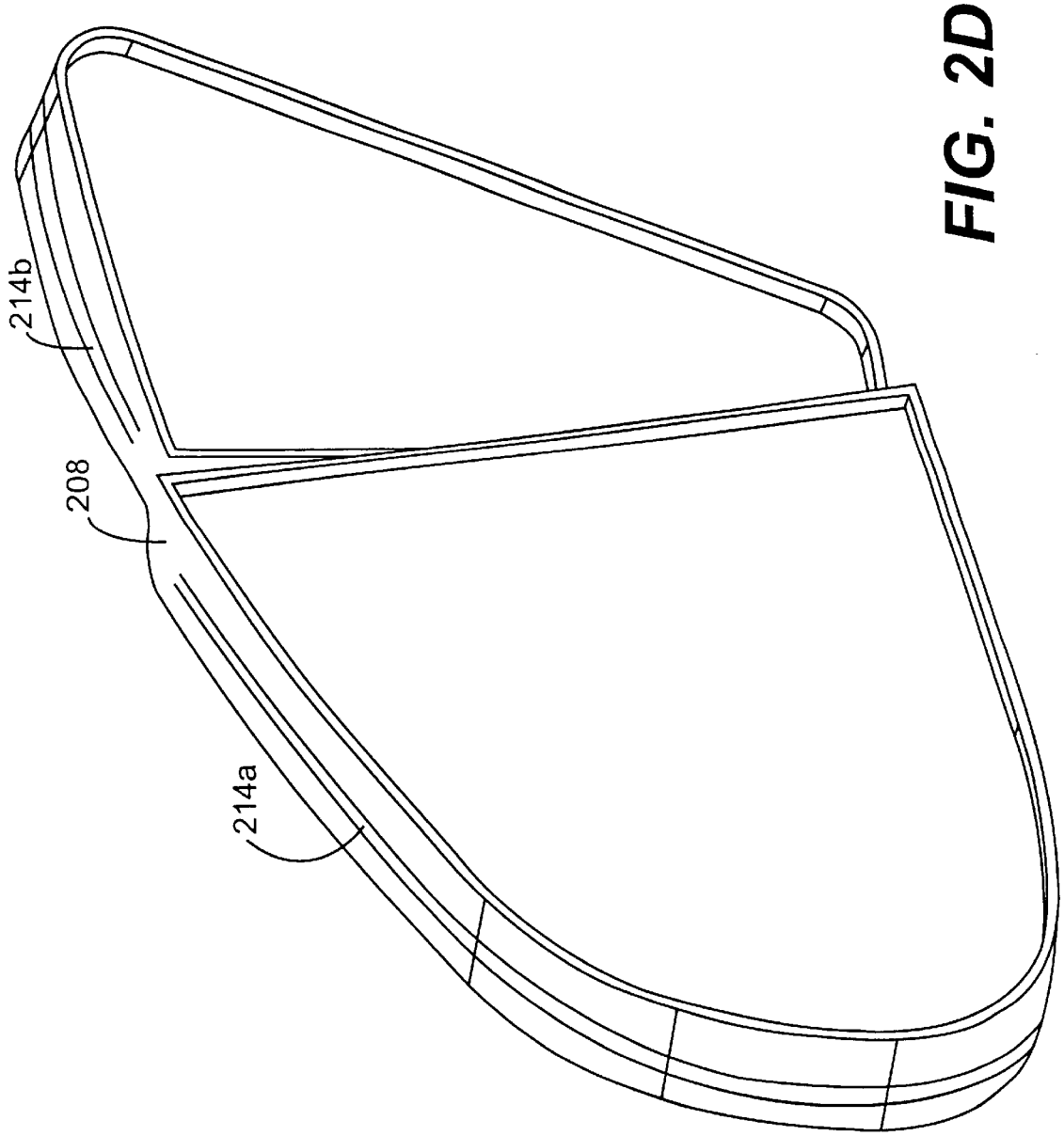
FIG. 2D illustrates a housing with slots for the planar mirrors according to a preferred embodiment of the present invention.

The preferred embodiment of the two-plane mirror of the present invention has two planes, and is referred to as a two-plane rear view safety mirror. Referring to FIGS. 2A and 2B, a left side rear view mirror 202 according to a preferred embodiment of the present invention is described. The left side rear view mirror 202 has a first (outside) plane 204 and a second (inside) plane 206. Each plane is a single-planed mirror, the construction of which is well-known to those skilled in the art. Planar mirrors 204 and 206 are housed in a housing or frame 208. Preferably housing 208 is a plastic housing having pockets or slots into which planar mirrors 204 and 206 are mounted. Alternatively, planar mirrors 204 and 206 can be mounted to housing 208 using an adhesive. Such mounting techniques and others are well-known to those skilled in the art.

Housing 208 itself can be mounted in a conventional way to a motor vehicle using a conventional connecting mechanism. In this manner, the entire housing can be adjusted as is done conventionally, and is therefore familiar to vehicle operator's. In addition, because the housing is mounted in a conventional way, the rear view safety mirror of the present invention can be sold as a retrofit to an existing vehicle by, for example, an after-market manufacturer, and installed by, for example, a mechanic or other person skilled in the art.

In the preferred embodiment left hand rear view mirror 202, planar mirrors 204 and 206 are mounted at an angle to one another. The angle is formed about angle line 207. In the preferred embodiment, the angle is approximately 15 degrees. However, other angles are possible and can be used within the scope and spirit of the present invention.

In addition, planar mirror 206 is preferably mounted at a steeper pitch than planar mirror 204. That is, planar mirror 206 is mounted so that its top is more toward the rear of the vehicle than its bottom, and at a steeper than any angle at which planar mirror 204 might be tilted. Referring to FIG. 2, this steeper pitch is formed by rotating planar mirror 206 about pivot point 210. In the preferred embodiment, planar mirror 206 is mounted so that is approximately 1.7 degrees greater in pitch than planar mirror 204.

Further, in an alternate embodiment, one or both of planar mirrors 204 and 206 can be independently adjusted by the operator. Allowing the operator to adjust the angle, provides the operator with a way to customize the angle to his or her desires. Constructing a housing containing independently adjustable slots or pockets is well-known to those skilled in the art.

Figure 3A:
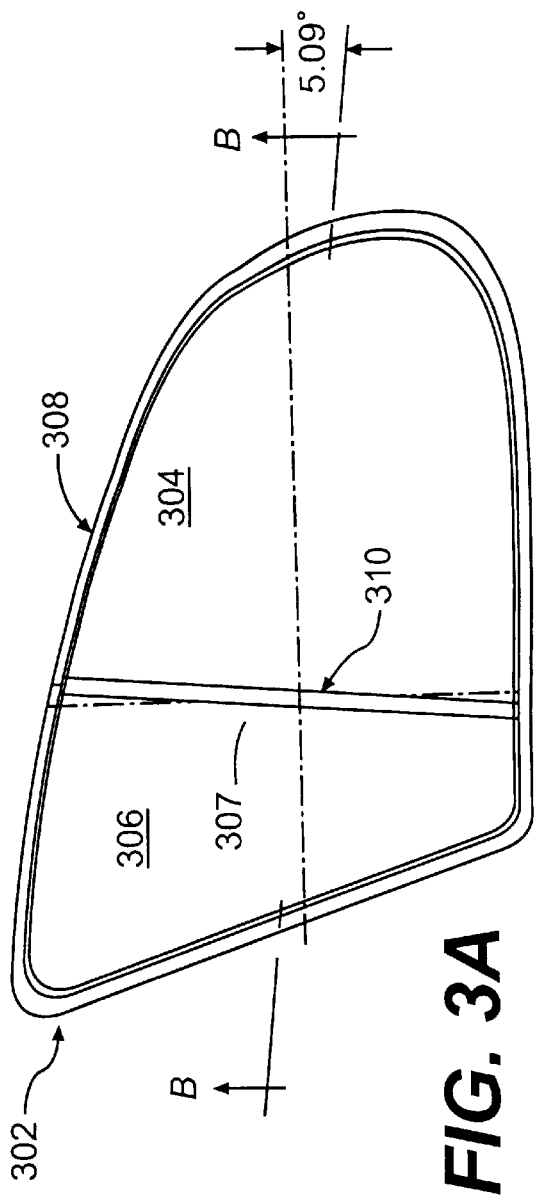
FIG. 3A is a schematic illustration of a front view of the right side rear view safety mirror according to a preferred embodiment of the present invention.
Figure 3B:
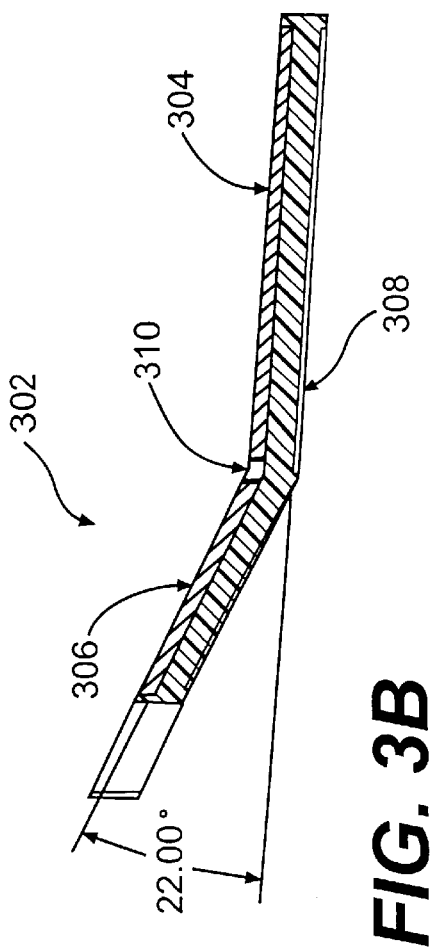
FIG. 3B is a cross-section of the rear view safety mirror illustrated in FIG. 1 taken along line B—B in FIG. 3A.

FIGS. 3A and 3B illustrate schematically a right side rear view safety mirror 302 according to preferred embodiment of the present invention. Referring to FIGS. 3A and 3B, right side rear view mirror 302 according to a preferred embodiment of the present invention is described. Like left side rear view safety mirror 202, right side rear view safety mirror 302 has a first (outside) plane mirror 304 and a second (inside) plane mirror 306. Each plane is a single-planed mirror, the construction of which is well-known to those skilled in the art. Planar mirrors 304 and 306 are housed in a housing or frame 308. Preferably, housing 308 is a plastic housing having pockets or slots into which planar mirrors 304 and 306 are mounted. Alternatively, planar mirrors 304 and 306 can be mounted to housing 308 using an adhesive. Such mounting techniques and others are well-known to those skilled in the art.

As described above with respect to right side rear view safety mirror 302, housing 308 itself can be mounted in a conventional way to a motor vehicle. In this manner, the entire housing can be adjusted as is done conventionally, and is therefore familiar to vehicle operator's. In addition, because the housing is mounted in a conventional way, the rear view safety mirror of the present invention can be sold as a retrofit to an existing vehicle by, for example, an after-market manufacturer, and installed by, for example, a mechanic or other person skilled in the art.

In the preferred embodiment right hand rear view mirror 302, planar mirrors 304 and 306 are mounted at an angle to one another. The angle is formed about angle line 307. In the preferred embodiment, the angle is approximately 22 degrees. However, other angles are possible and can be used within the scope and spirit of the present invention.

In addition, planar mirror 306 is preferably mounted at a steeper pitch that planar mirror 304. That is, planar mirror 306 is mounted so that its top is more toward the rear of the vehicle than its bottom, and at a steeper than any angle at which planar mirror 304 might be tilted. Referring to FIG. 3, this steeper pitch is formed by rotating planar mirror 306 about pivot In the preferred embodiment, planar mirror 306 is mounted so that is approximately 5 degrees greater in pitch than planar mirror 304.

Further, in an alternate embodiment, one or both of planar mirrors 304 and 306 can be independently adjusted by the operator. Allowing the operator to adjust the angle, provides the operator with a way to customize the angle to his or her desires. Constructing a housing containing independently adjustable slots or pockets is well-known to those skilled in the art.

Right hand rear view mirror 302 can be substantially similar to left hand rear view safety mirror 202 described above. However, in the preferred embodiment, the dimensions of the inside and outside planar mirrors of the right hand rear view safety mirror differ from those of the left hand rear view safety mirror. The reason for this is that the geometry of the operator's line of sight to the right rear view safety mirror differes from that to the left rear view safety mirror.

The operator is significantly closer to the left hand rear view safety mirror than the right hand rear view safety mirror. As a result, the field of view for the right and left side safety mirrors differs from the operator's viewpoint. When adjusted for optimum view, this geometry causes a conventional right side single plane mirror to have a view with a slightly wider portion of the reflected image devoted to the side of the vehicle than is observed on the left side of the vehicle when adjusted for optimum rear view. In addition, the angle between the single-planed mirrors is preferably more acute for the right side rear view safety mirror than the left side rear view safety mirror. As a result, in the preferred embodiment of the present invention, the inside mirror of the right hand rear view safety mirror is slightly wider than the inside mirror of the left hand rear view safety mirror.

In embodiments of the present invention having adjustable planar mirrors, the dimensions can be changed, and the operator can adjust the angle as desired.

In motorcycles, and other vehicles having a centrally located operator, the dimensions of and included angle between the inside and outside planar mirrors are substantially the same in both the left and right rear view safety mirrors. In embodiments of the present invention having adjustable capabilities, the angle may vary in accordance with the desires of the operator.

The angle between the two single-planar surfaces of the mirrors of the rear view safety mirror of the present invention, as well as the total and relative sizes of the two planes is a manufacturing design choice. These parameters are determined by each manufacturer to accommodate for the design of individual models.

Figure 4:
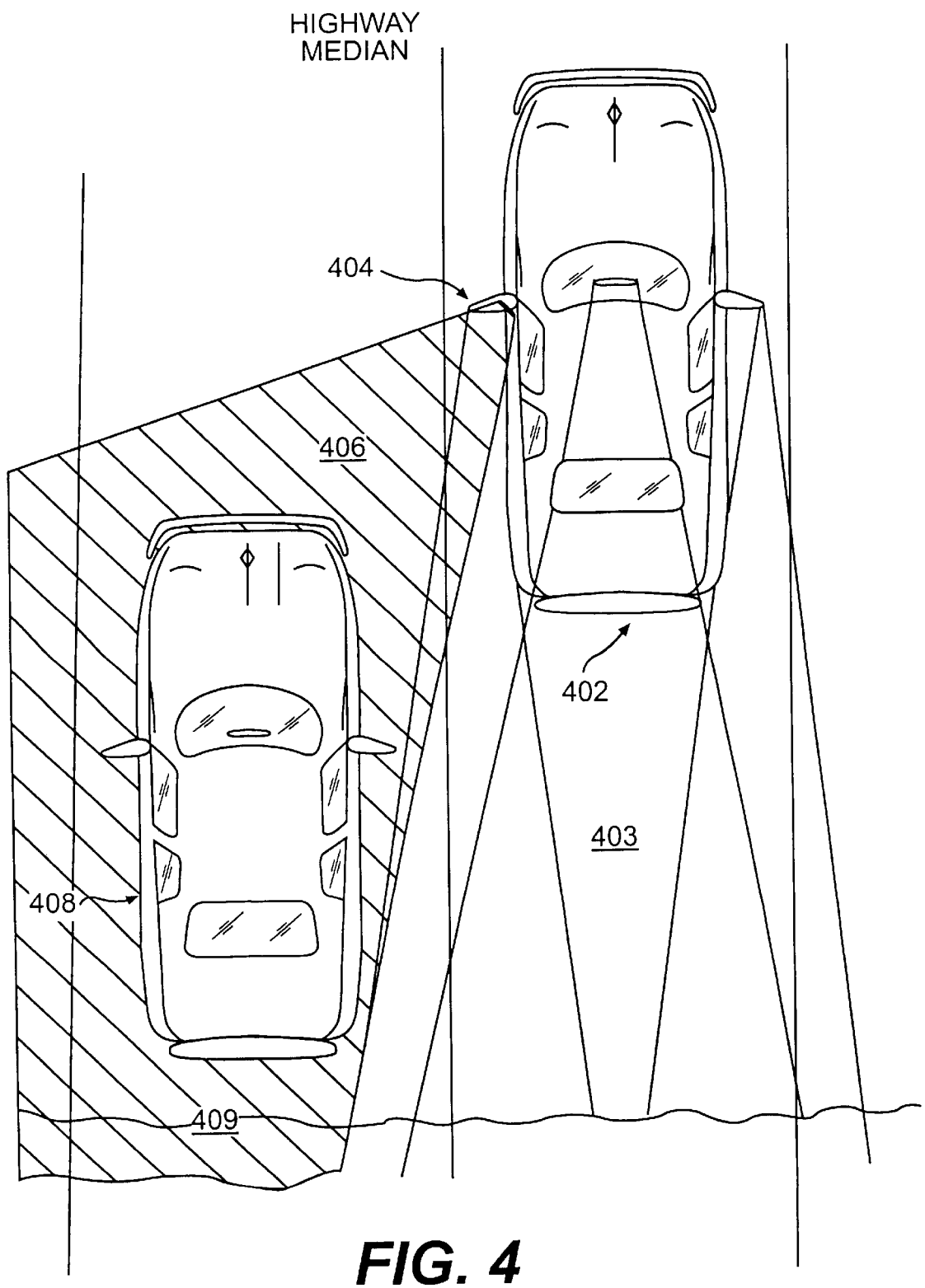
FIG. 4 illustrates schematically a left rear view safety mirror according to a preferred embodiment of the present invention mounted in a motor vehicle.

FIG. 4 illustrates schematically a left rear view safety mirror according to a preferred embodiment of the present invention mounted in a motor vehicle. Referring to FIG. 4, vehicle 402, traveling in lane 403, is equipped with a rear view safety mirror 404 according to a preferred embodiment of the present invention. As shown in FIG. 4, rear view safety mirror 404 extends the field of view for an operator of vehicle 402 as indicated by area 406. Area 406 is in the blind spot of a conventional rear view mirror, but is reflected in the image of a rear view safety mirror of the present invention. As a result, the operator of vehicle 402 can see an overtaking vehicle, such as vehicle 408, traveling in lane 409. As further shown in FIG. 4, area 406 extends substantially forward to where the operator of vehicle 402 can see vehicle 408 in his lateral vision.

Figure 5A:
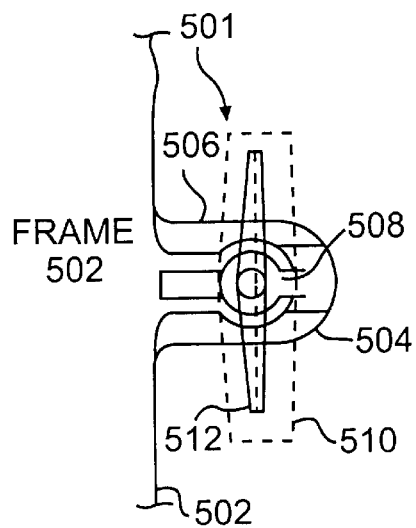
FIG. 5A illustrates schematically a side view of a conventional mounting for use with the present invention.

As described the rear view safety mirror of the present invention can be mounted to a vehicle in a conventional manner. Because the mounting to the vehicle is well-known to those skilled in the art, it will only be described briefly. Referring to FIG. 5A, a side view of a conventional mounting 501 for use with a preferred embodiment of the present invention is illustrated schematically. Frame 502 is representative of the frame of the rear view mirror of the present invention, for example frames 202 and 302. The plastic molding of frame 502 includes a clip or clasp 504. Clip 504 has a stop 506 on each side to limit the lateral movement of the spindle. Clip 504 attaches to a lateral arm 508 of a metal cross-spindle 510. Frame 502 rotates up and down about lateral arm 508 of cross-spindle 510. Cross-spindle 510 also includes a vertical arm 512. Vertical arm 512 attaches to a control mechanism that controls adjustment of the frame 502. Frame 502 rotates side-to-side about vertical arm 512 of cross-spindle 510.

Figure 5B:
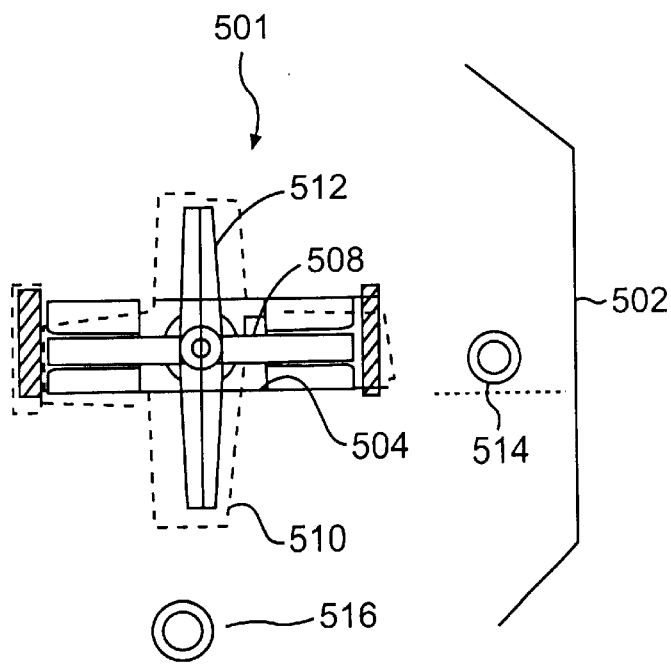
FIG. 5B illustrates schematically a facial view of a conventional mounting for use with the present invention.
Figure 5C:
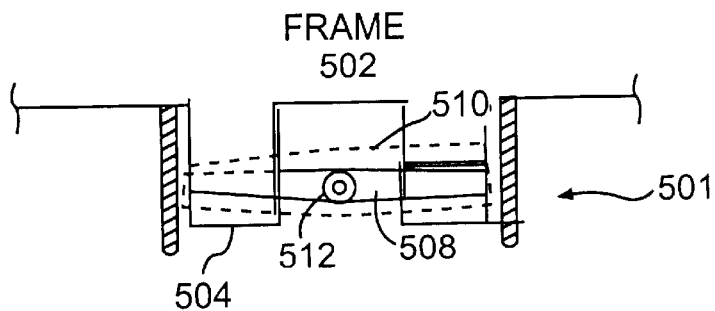
FIG. 5C illustrates schematically an overhead view of a conventional mounting for use with the present invention.

FIG. 5B illustrates schematically a facial view of the conventional mounting mechanism. As shown in FIG. 5B, frame 502 contains two receptors 514 and 516. Receptors are sockets into which adjustment control actuators are placed. The control actuators inserted into receptor 514 controls lateral adjustment. The control actuator inserted into receptor 516 control vertical adjustment. FIG. 5C illustrates schematically an overhead view of conventional mounting 501. The foregoing description of mounting 501 describes one possible mounting configuration for mounting the rear view safety mirror of the present invention to a vehicle. It would be apparent to those skilled in the art that there are a variety of other adjustment mounting configurations can be used within the scope and spirit of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A rear view safety mirror of a vehicle for eliminating a blind spot, comprising:

a first planar mirror having a first dimension;

a second planar mirror having a second dimension not equal to said first dimension and having a top side and a bottom side; and a housing into which said first and second planar mirrors are mounted to eliminate a blind spot by mounting said first and second planar mirrors next to one another, but not on top of one another, and such that a first plane in which said first planar mirror is mounted and a second plane in which said second planar mirror is mounted meet at a vertical angle line, wherein said first and second planes form an interior angle that is greater than 90 degrees and less than 180 degrees, and such that said top side of said second planar mirror is inclined more towards a rear of said vehicle than said bottom side of said second planar mirror therein forming a pitch angle with respect to said first planar mirror.

2. The rear view safety mirror recited in claim 1, wherein said housing has a first pocket into which said first mirror is placed and a second pocket into which said second mirror is placed, wherein said first and second pockets form said angle.

3. The rear view safety mirror recited in claim 1, wherein said housing has a first slot into which said first mirror is placed and a second slot into which said second mirror is placed, wherein said first and second slots form said angle.

4. The rear view mirror of claim 1 wherein said housing has a first pocket into which said first mirror is placed and a second pocket into which said second mirror is placed, wherein said first and second pockets form said interior angle and said first and second pockets cause said top side of said second planar mirror to be inclined more towards a rear of said vehicle than said bottom of said second planar mirror.

5. The rear view safety mirror recited in claim 1, wherein said first dimension substantially coincides with a portion of a conventional rear view mirror that reflects a rear and side structure a vehicle to which it is attached.

6. The rear view safety mirror recited in claim 1, wherein said housing is attached to a vehicle in a conventional manner.

7. A method for eliminating a blind spot of a single-plane rear view mirror of a vehicle for eliminating a blind spot, comprising the steps of:

mounting a first planar mirror having a first dimension in a first portion of a housing; and mounting a second planar mirror in a second portion of said housing, said second planar mirror having a second dimension not equal to said first dimension and having a top side and a bottom side to eliminate a blind spot by mounting said first and second planar mirrors next to one another, but not on top of one another, and such that a first plane in which said first planar mirror is mounted and a second plane in which said second planar mirror is mounted meet at a vertical angle line, wherein said first and second planes form an interior angle that is greater than 90 degrees and less than 180 degrees, and such that said top side of said second planar mirror is inclined more towards a rear of said vehicle than said bottom side of said second planar mirror therein forming a pitch angle with respect to said first planar mirror.

8. The rear view safety mirror recited in claim 7, further comprising the step of mounting said housing to a vehicle in a conventional manner.

9. The rear view safety mirror recited in claim 7, further comprising the step of choosing said first dimension such that it substantially coincides with a portion of a conventional rear view mirror that reflects a structure of a side and rear portion and structure of a vehicle to which it is attached.

10. A rear view mirror safety system of a vehicle for eliminating a blind spot comprising:

a left side rear view mirror, comprising:
a first housing;
a first planar mirror having a first dimension mounted in said first housing; and
a second planar mirror mounted in said first housing, said second planar mirror having a second dimension not equal to said first dimension and having a top side and a bottom side to eliminate a blind spot by mounting said first and second planar mirrors next to one another, but not on top of one another, and such that a first plane in which said first planar mirror is mounted and second plane in which said second planar mirror is mounted meet at a vertical angle line, wherein said first and second planes form an interior angle that is greater than 90 degrees and less than 180 degrees, and such that said top side of said second planar mirror is inclined more towards a rear of said vehicle than said bottom side of said second planar mirror; and a right side rear view mirror, comprising:
a second housing;
a third planar mirror having a third dimension mounted in said second housing; and
a fourth planar mirror mounted in said second housing wherein said second fourth planar mirror having a fourth dimension not equal to said third dimension and having a top side and a bottom side to eliminate a blind spot by mounting said third and fourth planar mirrors next to one another, but not on top of one another, and such that a third plane in which said third planar mirror is mounted and a fourth plane in which said fourth planar mirror is mounted meet at a vertical angle line, wherein said third and fourth planes form a second interior angle that is greater than 90 degrees and less than 180 degrees, and such that said top side of said fourth planar mirror is inclined more towards a rear of said vehicle than said bottom side of said fourth planar mirror.

11. The rear view mirror safety system recited in claim 10, wherein said first and second interior angles are substantially equal.

12. The rear view mirror safety system recited in claim 10, wherein said second interior angle is more acute than said first interior angle.

13. The rear view mirror system of claim 10, wherein said housing causes said top side of said second planar mirror to be inclined more towards a rear of said vehicle than said bottom of said second planar mirror and said housing causes said top of said fourth planar mirror to be inclined more towards a rear of said vehicle than said bottom of said fourth planar mirror.

14. The rear view safety mirror of claim 1, wherein said housing causes said first mirror to be steeper in pitch than said second mirror.

* * * * *